United States Patent
Braun et al.

(10) Patent No.: US 9,016,757 B2
(45) Date of Patent: Apr. 28, 2015

(54) FOLDING TOP FRAME FOR A MOTOR VEHICLE

(71) Applicant: Dr. Ing. h.c.F. Porsche Aktiengesellschaft, Stuttgart (DE)

(72) Inventors: Wolfgang Braun, Albershausen (DE); Reiner Armbruster, Muehlacker (DE); Dirk Kroeger, Merzen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 13/917,195

(22) Filed: Jun. 13, 2013

(65) Prior Publication Data

US 2013/0334836 A1 Dec. 19, 2013

(30) Foreign Application Priority Data

Jun. 14, 2012 (DE) .......................... 10 2012 105 171

(51) Int. Cl.
  *B60J 7/12* (2006.01)
(52) U.S. Cl.
  CPC .............. *B60J 7/1226* (2013.01); *B60J 7/1243* (2013.01)
(58) Field of Classification Search
  USPC ............ 296/100.14, 100.17, 100.18, 107.09, 296/109, 118, 121, 122, 123
  See application file for complete search history.

(56) References Cited

U.S. PATENT DOCUMENTS

| 2,833,593 | A | * | 5/1958 | Olivier et al. | 296/107.1 |
| 2,897,003 | A |   | 7/1959 | Lelli et al. | |
| 3,030,140 | A | * | 4/1962 | Probst | 296/107.09 |
| 5,829,821 | A | * | 11/1998 | Aydt et al. | 296/122 |
| 8,287,027 | B2 | * | 10/2012 | Wilke et al. | 296/107.09 |
| 2008/0106117 | A1 | * | 5/2008 | Garska et al. | 296/118 |

FOREIGN PATENT DOCUMENTS

| DE | 100 53 236 |    | 5/2002 |
| DE | 101 40 433 |    | 2/2003 |
| DE | 102 10 616 |    | 10/2003 |
| DE | 10053236 | C2 * | 10/2003 |
| DE | 20 2011 005 039 |    | 7/2011 |

OTHER PUBLICATIONS

German Search Report of Jan. 29, 2013.

* cited by examiner

*Primary Examiner* — Glenn Dayoan
*Assistant Examiner* — Jason S Daniels
(74) *Attorney, Agent, or Firm* — Gerald E. Hespos; Michael J. Porco; Matthew T. Hespos

(57) ABSTRACT

A folding top frame has a corner bow with a lower end connected pivotably to a main bow. A load-bearing support is articulated pivotably on a folding top bearing, and has a guide slot, at an end opposite the folding top bearing. The corner bow is guided in the guide track by way of a journal. In the closed position of the folding top frame, the journal is at a lower end stop of the guide slot so that the corner bow is supported.

9 Claims, 2 Drawing Sheets

FOLDING TOP FRAME FOR A MOTOR VEHICLE

CROSS REFERENCE TO RELATED APPLICATIONS

This application claims priority under 35 USC 119 to German Patent Appl. No. 10 2012 105 171.2 filed on Jun. 14, 2012, the entire disclosure of which is incorporated herein by reference.

BACKGROUND

1. Field of the Invention

The invention relates to a folding top frame for an adjustable roof of a motor vehicle.

2. Description of the Related Art

U.S. Pat. No. 2,897,003 discloses a folding top frame for an adjustable roof of a motor vehicle. The folding top frame of U.S. Pat. No. 2,897,003 has a corner bow that is mounted about a pivot axis on a link. A guide element extends beyond the pivot axis and is oriented downward in a closed position. The guide element has a slot-shaped guide track into which a journal of a further link arm projects and the corner bow is guided at least during a depositing movement.

U.S. Pat. No. 3,030,140 and DE 101 40 433 A1 disclose further corner bows with slotted guides that serve merely to control the movement.

It is an object of the invention to provide a folding top frame for an adjustable roof of a motor vehicle where the folding top frame has a corner bow that is guided in the individual adjusting movements of the roof and holds the closed roof in a secured position.

SUMMARY OF THE INVENTION

The invention relates to a folding top frame with a load-bearing support. The folding top frame has a corner bow that first is guided and second is supported in a closed position of the roof so that the roof can assume a secured position. To achieve this objective, the corner bow has a fork with a bearing arm and a supporting arm at the lower free end. The corner bow is connected pivotably to the main bow via a mounting at the lower end of the bearing arm and the main bow is articulated on the folding top bearing in a mounting. A journal is connected to the supporting arm of the corner bow. The journal is guided in an opposite guide track of the guide arm of the load-bearing support. The corner bow is supported in a closed position of the roof on a lower stop of the guide track via the journal.

The load-bearing support preferably is configured in one piece and has a lower supporting arm connected pivotably to the folding top bearing via a bearing and is adjoined by the upper guide arm of the load-bearing support. The guide track for the journal preferably is integrated into the guide arm and has a slot. A lower end of the slot is widened and functions as an end stop for the journal. The journal is held in a secured manner in the widened portion of the slot in the closed position.

The connection of the corner bow to the main bow and the guidance via the journal in the slot-shaped guide track enables the corner bow to be moved in a positively guided manner into an open and closed position of the roof during pivoting of the main bow. In the closed position, the load-bearing support advantageously achieves a situation where the journal on the corner bow is situated in a lower stop position of the slot and can be supported in the load-bearing support. In the open position, the journal is situated in an upper stop position of the slot.

The guide arm of the load-bearing support with the integrated guide track has a vertical extent in the closed position of the roof and is arranged to be oriented approximately identically with the corner bow.

The supporting arm of the corner bow forms a projection of the fork and is shorter than the bearing arm of the corner bow. The bearing arm of the corner bow is at a lateral spacing from the supporting arm and has a section that covers with respect to the guide arm of the load-bearing support and in which the journal is arranged.

The bearing point or the mounting of the corner bow is at a lower point on the main bow in the closed position than the journal of the corner bow is arranged in the guide arm of the load-bearing support. This arrangement and configuration of the corner bow and of the bearing points results in an optimum supporting base for the corner bow on the main bow and on the load-bearing support. The optimum supporting base is assisted further by the bearing arm of the corner bow and the supporting arm of the load-bearing support being arranged in a triangular manner with respect to one another. Additionally, the mounting of the corner bow on the main bow and the mounting of the load-bearing support on the folding top bearing are arranged at a longitudinal spacing from one another, and the journal lies between the two mountings at a vertical spacing.

One exemplary embodiment of the invention is shown in the drawings and will be described in greater detail in the following text.

DETAILED DESCRIPTION OF THE PREFERRED EMBODIMENT

Figure 1:
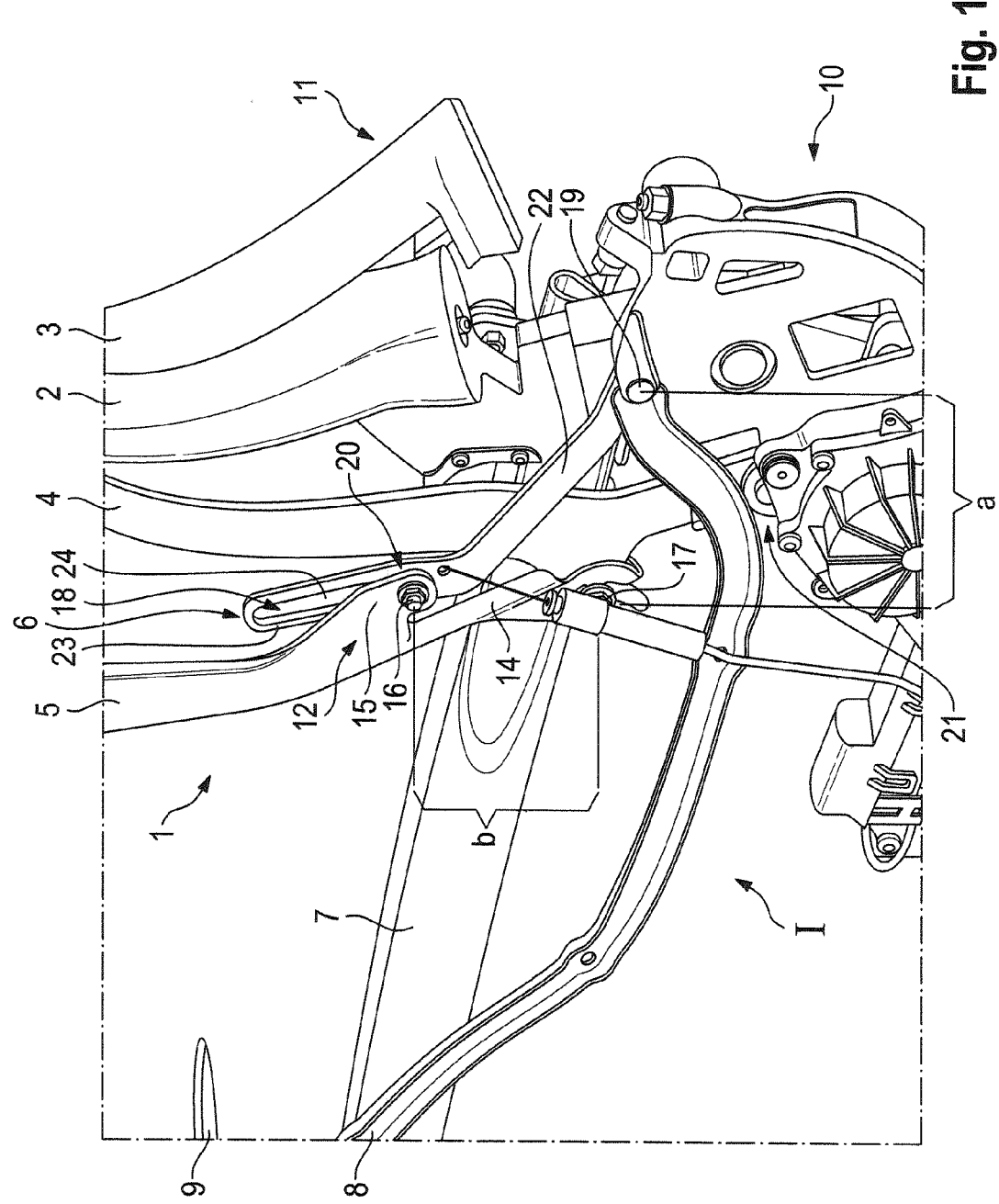
FIG. 1 shows a part detail of a folding top frame for an adjustable vehicle roof in a closed position with a corner bow which is supported in a load-bearing support.
Figure 2:
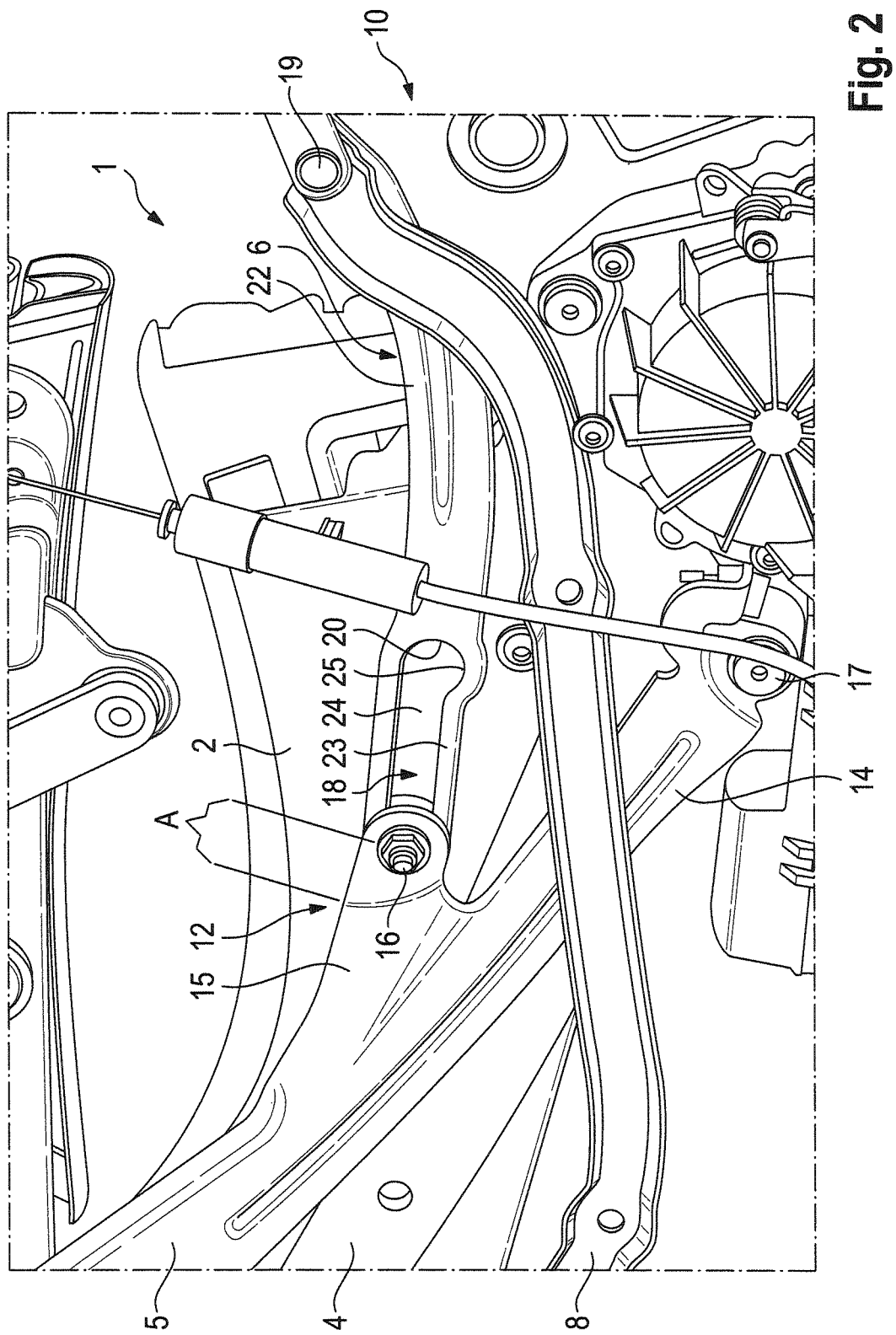
FIG. 2 shows a part detail of the folding top frame according to FIG. 1 with a position of the corner bow and the load-bearing support, in which they are situated in an open position of the roof.

A folding top frame 1 has a main link 2, a roof link 3, a main bow 4, a corner bow 5, a load-bearing support 6, a tensioning bow 7 and a supporting lever 8 for a rear window 9 of the vehicle. Furthermore, a folding top bearing 10 and a main four-bar linkage 11 are provided. A lower end of the main bow 4 is articulated to the folding top bearing 10 at a mounting 21.

The corner bow 5 is arranged close to the rear window 9 and between the rear window 9 and the main bow 4. A fork 12 is formed at the lower end of the corner bow 5 and includes a bearing arm 14 and a supporting arm 15. A mounting 17 pivotably connects the bearing arm 14 of the corner bow 5 to the main bow 4, which is articulated on the folding top bearing 10.

A journal 16 is connected fixedly to the supporting arm 15 of the corner bow 5 and engages in a guide track 18 of the load-bearing support 6, which is articulated on the folding top bearing 10 via the bearing 19. The journal 16 is guided in the guide track 18. In the closed position I of FIG. 1, the journal 16 bears against a lower end stop 20 of the guide track 18 and supports the corner bow 5 on the load-bearing support 6.

The load-bearing support 6 is configured in one piece and comprises a lower supporting arm 22 and an upper guide arm 23. The lower supporting arm 22 is connected pivotably to the folding top bearing 10 via the bearing 19. The guide track 18 is integrated in the guide arm 23 and comprises a slot 24. The lower end of the slot 24 has a widened portion 25, which forms the lower end stop 20 for the journal 16 in the closed position I.

The guide arm 23 of the load-bearing support 6 with the integrated guide track 18 has an approximately vertical extent in the closed position I of the roof and is oriented approximately identically with the corner bow 5.

An extending distance of the supporting arm 15 of the corner bow 5 from a fork 12 is shorter than an extending distance of the bearing arm 14 of the corner bow 5.

The supporting arm 15 is spaced laterally from the bearing arm 14 and has a section A that covers the guide arm 23 of the load-bearing support 6 and in which the journal 16 is arranged.

The bearing point or the mounting 17 of the corner bow 5 on the main bow 4 is lower than the journal 16 in the supporting arm 15 of the corner bow 5 when the folding top arrangement is in the closed position I.

The bearing arm 14 of the corner bow 5 and the supporting arm 22 of the load-bearing support 6 are arranged in an approximately triangular manner with respect to one another. The mounting 17 of the corner bow 5 on the main bow 4 and the mounting 19 of the load-bearing support 6 on the folding top bearing 10 are spaced longitudinally from one another, while the journal 16 lies between the two mountings 17 and 19 at a vertical spacing b.

What is claimed is:

1. A folding top frame for an adjustable roof of a motor vehicle comprising:
    a folding top bearing;
    a main bow articulated on the folding top bearing in a mounting;
    a corner bow being arranged between a rear window of the vehicle and the main bow, the corner bow having a fork defining a bearing arm and a supporting arm at a lower end of the corner bow, a lower end the bearing arm of the corner bow being held pivotably on the main bow via a mounting, the supporting arm of the corner bow having a journal;
    a load bearing support having a guide arm with a guide track having a lower end stop, the journal of the supporting arm of the corner bow being guided in the guide track of the guide arm of the load-bearing support, the journal of the supporting arm being supported on the lower end stop of the guide track of the load-bearing support in a closed position of the roof, the load bearing support further having a lower supporting arm adjoining a lower end of the guide arm and being connected pivotably to the folding top bearing; and
    a support lever for the rear window having a front end pivotably connected to the folding top bearing.

2. The folding top frame of claim 1, wherein the load-bearing support is configured in one piece with the lower supporting arm being connected pivotably to the folding top bearing via a bearing.

3. The folding top frame of claim 2, wherein the guide track for the journal is a slot extending in a longitudinal direction of the guide arm, a widened portion being at a lower end of the slot and defining the stop for the journal, the journal being held in the widened portion of the slot in the closed position.

4. The folding top frame of claim 3, wherein the guide arm of the load-bearing support is aligned approximately vertically in a closed position of the roof and is oriented approximately identically with the corner bow.

5. The folding top frame of claim 3, wherein the supporting arm of the corner bow forms a projection of the fork and is shorter than the bearing arm of the corner bow which runs at a lateral spacing from the supporting arm, the supporting arm having a section that covers the guide arm of the load-bearing support and in which the journal is arranged.

6. The folding top frame of claim 1, wherein a mounting of the corner bow on the main bow is lower than the journal of the corner bow in the guide track of the load-bearing support.

7. The folding top frame of claim 1, wherein the bearing arm of the corner bow and the supporting arm of the load-bearing support are arranged in a triangular manner with respect to one another, the mounting of the corner bow on the main bow and the bearing of the load-bearing support on the folding top bearing being at a longitudinal spacing from one another, and the journal lying higher than said two mountings in the closed position of the roof.

8. The folding top frame of claim 1, wherein the front end of the support lever for the rear window and a lower end of the supporting arm of the load bearing support are connected pivotably to the folding top bearing at a common bearing.

9. The folding top frame of claim 1, wherein the journal of the corner bow is substantially vertically above the pivotable mounting of the corner bow on the main bow in the closed position of the roof.

* * * * *